Feb. 12, 1957  A. E. SPRANDO  2,781,463
HERMETICALLY SEALED MOTOR
Filed Jan. 12, 1955
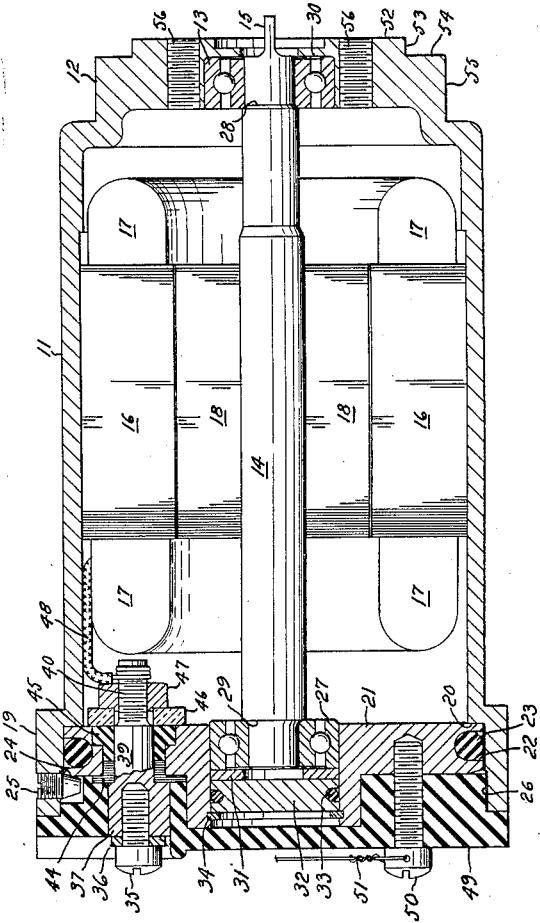
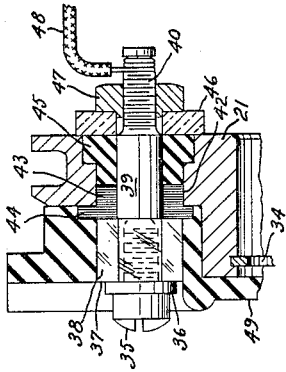
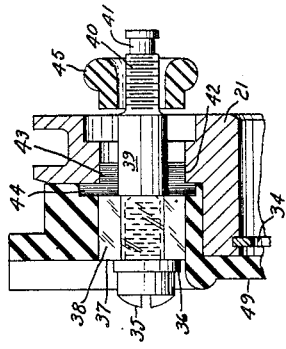
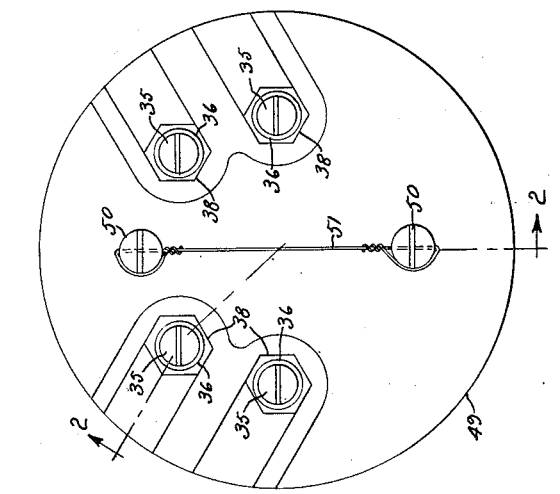
INVENTOR.
Anthony E. Sprando
BY
AGENT

United States Patent Office 2,781,463
Patented Feb. 12, 1957

2,781,463
HERMETICALLY SEALED MOTOR

Anthony E. Sprando, Portland, Oreg., assignor to Iron Fireman Manufacturing Company, Portland, Oreg.

Application January 12, 1955, Serial No. 481,362

2 Claims. (Cl. 310—71)

This invention relates generally to electric motors and more specifically to small high speed motors adapted for use in military airplanes. Specifically the motor of this invention is provided with a cylindrical frame enclosure formed at one end with an integral end bell having a central shaft bearing seat and means for sealed attachment to another sealed enclosure for the load apparatus to which the motor is drivably applied.

To understand the special nature of the motor here disclosed it should be noted that the motor frame is less than one end eleven sixteenths inches in diameter and three inches long and operates at more than ten thousand revolutions per minute. The motor must be sealed against an ambient pressure of forty-five pounds per square inch and operate with an ambient temperature range of minus 650° C. to plus 175° C. The motor must operate from sea level to 50,000 feet altitude and withstand shocks of the order of thirty gravitational units. The electrical circuit parts must be insulated for a dielectric strength of 1250 volts.

It is a particular object of this invention to provide a closure for the front or open end of the cylindrical motor frame which will provide means for supporting the front end shaft bearing of the motor and means for mounting the electric terminals of the motor and at the same time preserve the hermetically sealed condition of the motor over the wide range of operating conditions to which it will be subjected.

It is a second object to provide such a closure which can be quickly and easily assembled into a complete sub-assembly and then quickly and easily assembled with the other motor elements to complete the motor.

It is a third object to provide such a sub-assembly which can be easily and quickly disassembled from the other motor parts without destruction or mutilation of any of the parts and which can be easily and quickly disassembled into its component parts without mutilation or destruction of any of the parts.

How these and other objects are attained is explained in the following specification referring to the attached drawing in which Figure 1 is a view in elevation of the front or terminal end of the motor of this invention.

Figure 2 is a sectional view along the line 2—2 of Figure 1.

Figure 3 is a fragmentary enlargement of the upper left hand corner of Figure 2.

Figure 4 is fragmentary view similar to Figure 3 but with the terminal seal partially disassembled.

Like numerals of reference refer to like parts in the several figures of the drawing.

Referring now to the drawing in Figure 2 the motor of this invention is seen to include a cylindrical aluminum metal frame 11 with an integral end 12 formed to include a seat for ball bearing 13 adapted to support shaft 14 formed with a driving end 15. The motor stator iron laminations are indicated at 16 with windings 17. The rotor iron laminations are indicated at 18 as being carried on shaft 14. The particular motor indicated here is a two phase induction type motor but since the electrical characteristics of the motor are not part of the present invention the winding details are omitted in the interest of clarity of presentation of the invention which comprises the motor generally and its front end closure specifically.

The open or front end of frame 11 is seen to be formed with an integral cylindrical collar 19 larger in both inside and outside diameters than frame 11 thereby to form in the end of frame 11 an internal annular rabbet 20 adapted to receive as shown front steel end bell or bearing and terminal support 21 formed on its outer diameter with annular groove 22 adapted to receive silicone rubber O-ring 23 in compressed relations with the internal cylindrical surface of collar 19 of frame 11. The outer edge 24 of end bell 21 is seen to be bevelled to mate with the tapered ends of three equally circumferentially spaced locking set screws 25 threaded through holes provided for them as shown in the extended end 26 of collar 19. As indicated on Figure 2 for ease of assembly of end bell 21 with O-ring 23 into rabbet 20 the internal diameter of the extended end 26 of collar 19 is increased.

End bell 21 is formed with an axial cylindrical hole therethrough adapted as shown to form a seat for shaft bearing 27. It is to be noted that the inner side faces of bearings 13 and 27 are spaced by shoulders 28 and 29 on shaft 14 while the outer edge faces of bearings 13 and 27 abut repectively the face 30 of end bell 12 and stainless steel shim 31 having a thickness selected for proper fit in the final assembly of end bell 21 into frame 11.

For sealing the bearing seat bore in end bell 21 there is provided an aluminum alloy seal disk 32 grooved on its outer diameter to receive silicone rubber O-ring 33 in compressed relation with the bearing seat bore. Steel C-ring 34 set into a mating groove formed in the surface of the bearing seat bore in end bell 21 holds seal disk 32 against the shim 31 of selected width to establish the desired degree of fit or end play in the shaft and bearing system of the motor.

As shown in Figure 1 there are four motor terminal screws 35, two each for the windings of each phase of the two phase motor. As shown in Figure 2, each of these screws is provided with a binding washer 36 between which and the end of its respective hard brass terminal stud 37 one of the power feed wires, not shown, of the motor is held. Each of the terminal studs 37 is formed with a hexagonal head 38, a smaller diameter cylindrical sealing section 39, a still smaller diameter threaded locking section 40, and a yet smaller diameter wire attachment grooved section 41, see Figure 4. Head 38 is internally bored and threaded to receive terminal screw 35 as shown.

As shown in Figure 4 for each of the terminal studs 37, end bell 21 is bored as at 42 to receive the cylindrical extension 43 of a suitable headed insulating bushing 44 and counterbored on its inner face to receive a suitable necked O-ring 45 held in position, Figure 3, by a suitable insulating washer 46 and binding nut 47 threaded onto section 40 of stud 37. In practice bushing 44 is made of "teflon" or a silicon glass laminate, O-ring 45 is made of silicone rubber and washer 46 is made of glass filled melamine. Other materials of suitable mechanical and electrical characteristics could be used.

Motor terminal wires 48 are of sufficient length so that the insulation can be removed from their ends, the ends each wrapped around section 41 of its respective terminal stud 37 and soldered thereto, and then the sub-assembly of end bell 21 with insulated studs 37, bearing 27 and O-ring 23 can be carefully assembled over shaft 14 and into collar 19 of frame 11. Stainless steel set screws 25 are then set to hold end bell 21 firmly in place, selected stainless steel shim 31 and seal disk 32 with O-ring 33 are positioned in the bearing bore as shown and the bearing assembly locked with C-ring 34.

Essentially the assembly is now complete but in order to have an insulating dust cover, guides for the power wires under screws 35 and a surface on which terminal markings can be placed, cover 49 of molded alkyd plastic is suitably formed and provided and assembled into place on end bell 21 by two screws 50 locked against loosening by vibration by wire 51 through their heads.

The rear integral end 12 of frame 11 is seen to be formed with finished surfaces 52, 53, 54 and 55 and with threaded holes 56 for the purpose of registration and attachment of the enclosure for the mechanical load to which the motor is applied.

Having recited some of the objects of my invention, illustrated and described a preferred form in which the invention may be practiced and shown its construction for a specific use, I claim:

1. An electric motor having a primary winding and a shaft surrounded by a cylindrical frame having a closed end and an open end, the open end of said frame being formed with a cylindrical extension of larger inside diameter than said frame, an end plate for said open end of said frame, a rear bearing for said shaft supported axially in said closed end of said frame with the driving end of said shaft extending therethrough, a front bearing for said shaft, said end plate being formed with a cylindrical bore axially therethrough adapted to receive and support said front bearing, a plurality of terminal studs for said primary winding, each of said studs being formed with a head section, a cylindrical section of smaller diameter than said head section and a cylindrical threaded section of smaller diameter than said cylindrical section, said end plate being formed with a plurality of transverse holes therethrough to receive and support said studs individually in said holes, means for securing said end plate in the end of said frame within said extension thereof, means for hermetically sealing each one of said terminal studs in a respective one of said transverse holes in said end plate and means for hermetically sealing said axial bearing supporting bore in said end plate, said means for sealing said end plate in said extension of said frame comprising an annular groove formed in the periphery of said end plate and an O-ring supported in said groove in compressed relation with the internal cylindrical surface of said extension, said means for sealing one of said terminal studs in one of said transverse holes in said end plate comprising a cylindrical substantially rigid insulating bushing having a head of larger diameter than said hole, said bushing extending into said hole from the front side of said end plate, said hole in said end plate being counterbored from its rear end to a larger diameter than said hole, a necked O-ring in said counterbore with the neck of said necked O-ring extending into said hole, a substantially rigid insulating washer adjacent said necked O-ring at the rear of said plate, said stud extending through said bushing said necked O-ring and said washer from the front of said plate with the head of said stud adjacent the front of said plate and the threaded section of said stud extending rearwardly from said plate, a nut threaded onto said stud, a lock washer surrounding said stud between said nut and said insulating washer, said nut being tightened on said stud to compress said necked O-ring sealably between said stud and said end plate, said means for sealing said axial bearing supporting bore in said end plate comprising a disk in said axial bore in front of said shaft and said front end bearing, said disk being formed with an annular groove in its peripheral edge, an O-ring in said groove in said disk in compressed relation to the inner surface of said axial bore and means for securing said disk axially in said axial bore.

2. An end plate sub-assembly for a motor having a cylindrical frame with an open end adapted to be hermetically sealed by said end plate, said sub-assembly comprising a metal disk formed with a peripheral annular groove adapted to receive a resilient O-ring therein, said groove and said O-ring being of such size as to enter said open end of said frame with said O-ring compressed between said peripheral groove of said end plate and the interior of said frame, said metal disk having a central hub formed thereon with an axial bore therethrough adapted to receive a front end bearing for said motor, the cylindrical surface of said bore being formed with an annular groove adapted to receive a C-ring for the purpose of limiting the axial position of said front end bearing, and said metal disk being formed with a plurality of circular holes therethrough between said hub and the periphery of said disk, each of said circular holes being counterbored to a larger diameter from one side of said disk, a motor terminal stud in each of said circular holes, said stud having a head section of larger diameter than said circular holes, a cylindrical section of smaller diameter than said circular holes and a threaded section extending through said disk and the counterbored side thereof, a substantially rigid insulated bushing surrounding said stud in said hole, said insulated bushing having a head section of larger diameter than said circular hole between the outer face of said disk and the head of said stud, a necked O-ring surrounding said cylindrical section of said stud at the counterbored end of said circular holes, the neck of said necked O-ring extending into said circular hole, a lock washer and a nut on the threaded end of said stud, a substantially rigid insulating washer of larger outside diameter than said counterbore surrounding said stud between said necked O-ring and said lock washer, and said nut being tightened on said stud to secure said stud insulatedly to said metal disk through its respective circular hole in said metal disk.

References Cited in the file of this patent
UNITED STATES PATENTS

| | | |
|---|---|---|
| 1,520,237 | Gilchrist | Dec. 23, 1924 |
| 1,934,963 | Bossard | Nov. 14, 1933 |
| 2,251,816 | Arutinoff | Aug. 5, 1941 |
| 2,683,830 | Staak | July 13, 1954 |